United States Patent Office 3,001,405
Patented Sept. 26, 1961

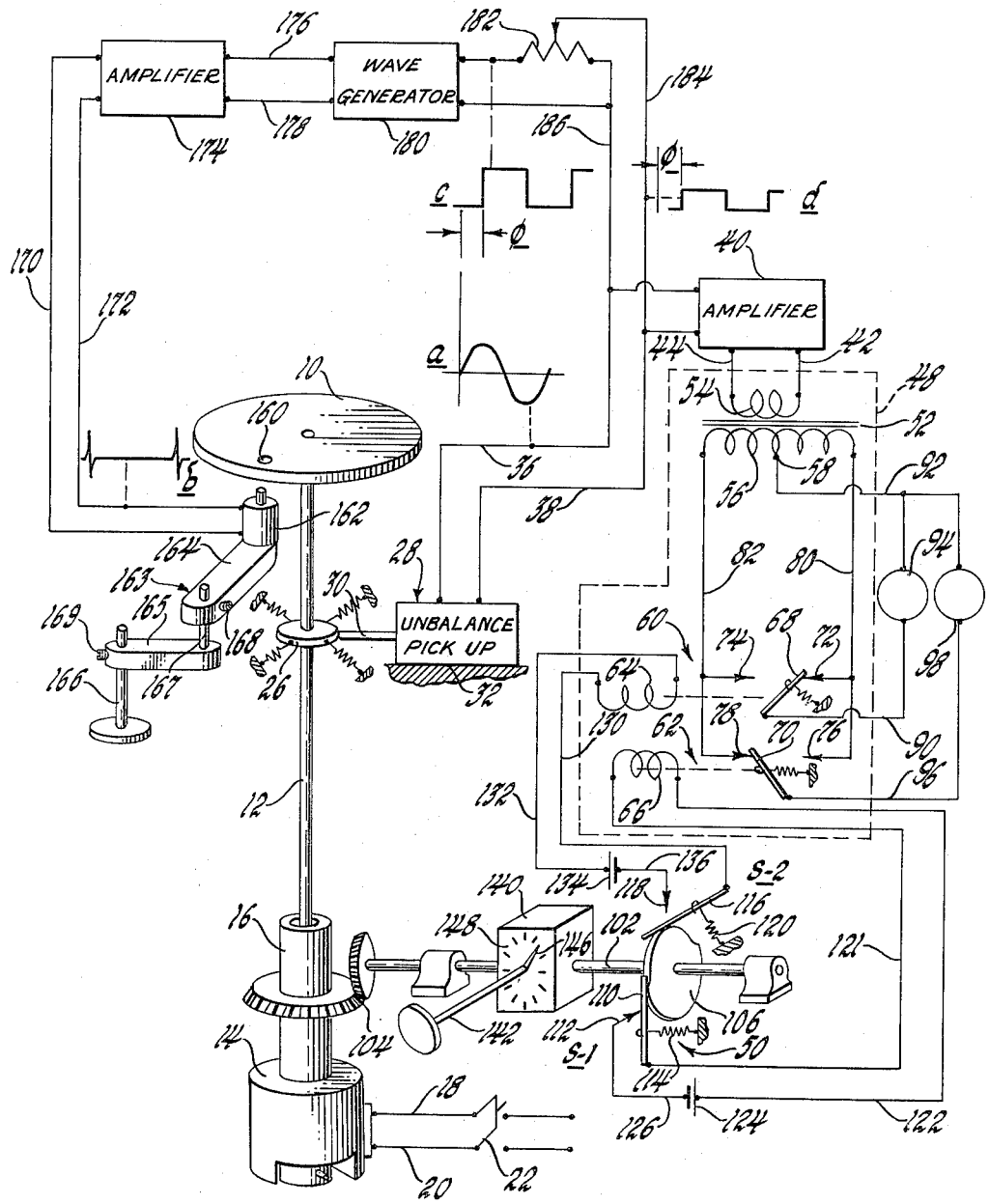

3,001,405
UNBALANCE COMPENSATOR
Philip K. Trimble, Rochester, Mich., assignor to General Motors Corporation, Detroit, Mich., a corporation of Delaware
Filed Jan. 18, 1956, Ser. No. 559,817
5 Claims. (Cl. 73—464)

This invention relates to unbalance measuring apparatus and to electrical unbalance compensating means therefor. More specifically, the invention relates to an unbalance compensating apparatus by means of which the unbalance determination will include a compensating component whereby "correcting" the unbalance by the indicated amount will result in a residual unbalance at a particular angle or location in the workpiece.

Oftentimes, it is desired to leave a certain amount of residual unbalance at a specified angle in a workpiece after balancing thereof and before it is completely assembled in order to counter-balance or compensate for any unbalance that may be contributed to the workpiece from components that are subsequently added thereto. Inasmuch as the location of the residual or compensating unbalance will rarely, if ever, coincide with the location of the actual unbalance in the part, vector resolving considerations are involved in order to effect such compensations.

Unbalance compensation of this character has been accomplished heretofore by mechanical means such, for example, as by the use of ring weights, which are positioned on the part in a particular manner as in production balancing of crankshafts, for example, or by the use of compensating bob weights which are driven with the balancing machine spindle on a counter or idler shaft. In those cases where positioned loading of the part or workpiece relative to the balancing machine spindle is feasible, that is where the part is always placed on the spindle in a certain position relative thereto, mechanical compensation could be built into the spindle of the balancing machine.

The use of ring weights may be objectionable in that the weights, which are precision machined devices, must be individually attached to and removed from each crankshaft prior to and upon completion of the unbalance determining cycle, thus requiring a substantial expenditure of time. The use of the bob weight type of unbalance compensator adds cumbersome, bulky mechanism to the balancing machine and may not be feasible where considerations of space are of importance.

The present invention has for its general object to provide an unbalance compensation apparatus which is of a completely electrical character, which avoids the use of slave parts and/or the requirement of positioned loading, and which is characterized by extreme simplicity and versatility.

The above and other objects of the invention, together with the advantages and features thereof, will appear more fully from the following detailed description and drawing which is a diagrammatic illustration of the general organization of an unbalance measuring system using a form of electrical unbalance compensation apparatus in accordance with the present invention.

The invention is shown in a dynamic type balancing machine in which the part 10, whose characteristics of unbalance are to be determined, is mounted on a vertically disposed, flexibly mounted spindle 12 driven by a constant speed electrical drive motor 14 having a hollow drive shaft 16. The motor 14 is adapted to be connected over conductors 18, 20 through a switch 22 to a suitable source of electrical power. The machine spindle 12 extends coaxially through the hollow drive shaft of the motor and is connected at its lowermost end to the lower end of the motor drive shaft 16 through a universal joint or connection, in known manner. The uppermost portion of the balancing machine spindle is resiliently supported in a spring mounted bearing 26 which permits oscillation or deflection of the balancing machine spindle under the influence of unbalance in the workpiece.

Suitably mounted in contacting relation with the vibratile or oscillatable spindle 12 or bearing 26 is a conventional pickup transducer 28, which may be of the electrodynamic variety having a movable probe 30 and a stator casing 32 that is fixedly mounted on a stationary part of the balancing machine. The pickup develops an alternating current, sinusoidal signal shown at $a$ having a frequency corresponding to the speed of the drive motor and an amplitude that varies in accordance with the amount of unbalance in the workpiece, as determined by the amount of deflection of the balancing machine spindle in a horizontal plane containing the movable probe of the pickup. The electrical signal developed by the pickup will bear a phase relationship with respect to a fixed point on the spindle or workpiece corresponding to the location of the unbalance therein.

The output from the pickup is applied over conductors 36, 38 to the input of a conventional amplifier 40 whose output is, in turn, connected over conductors 42, 44 to the input terminals of a demodulator or chopper device 48. The device 48 is shown as being of the synchronous, electromechanical relay operated variety and is controlled from an adjustable contactor or commutator mechanism shown generally at 50. The commutator mechanism 50 functions to provide a pair of 90° displaced reference control signals whose phase displacement from the position of a fixed point on the workpiece can be varied. The device 48 includes a transformer 52 which has a primary winding 54 and a secondary winding 56 with a center tap connection 58, and a pair of S.P.D.T. relays 60, 62. Each of the relays 60 and 62 includes an activating coil 64, 66 for operating their individual spring-biased switch arms 68 and 70 between fixed contacts 72, 74 and 76, 78, respectively. One end of the transformer secondary winding 56 is connected over conductor 80 to contacts 72 and 76 of relays 60 and 62, and its other end connected over conductor 82 to contacts 74 and 78.

Switch arm 68 of relay 60 and the transformer secondary center tap 58 are conducted over conductors 90 and 92 to a suitable utilizing device, such as an indicator 94, on which is displaced or recorded a quantity related to the amplitude of unbalance in the workpiece. Switch arms 70 of relay 62 and the transformer secondary center tap 58 are connected over conductors 96 and 92 to another utilizing device 98, which can be a zero center indicating meter.

The commutator or synchronously driven contact mechanism 50 and which provides the reference control for the synchronous device 48, includes a spindle 102 which is shown as being driven from the motor drive shaft 16 through a set of unity ratio bevel gears shown at 104 and mounts a 180 degree cam 106 which actuates a pair of switches indicated at S-1, S-2 positioned 90 degrees in space apart. Switch S-1 includes a spring-biased movable contact arm 110 and a stationary contact 112 which are normally spaced apart in non-contacting or open circuit relation by means of the spring 114 urging arm 110 against the cam. Switch S-2 also includes a spring-biased movable contact arm 116 and a stationary contact 118 which are spaced apart in non-contacting or open circuit relation by the spring 120 urging the arm 116 against the cam, as shown. Switch S-1 is adapted to complete an electrical circut therethrough for the relay coil 66 of chopper 48 during one-half period of each revolution of the balancing machine spindle. This circuit may be traced from arm 110, conductor 121 which is connected to one side of relay coil 66, the opposite side of which is connected over conductor 122 through battery 124 and conductor 126 to stationary contact 112.

The cam actuated switch S-2 is adapted to complete an electrical circuit therethrough for the relay coil 64 during one-half period of each revolution of the balancing machine spindle with its contacts being closed 90 degrees in time behind the closing of the contacts of switch S-1. This circuit may be traced from arm 116, conductor 130 which is connected to one side of relay coil 64, the opposite side of which is connected over conductor 132 through battery 134 and conductor 136 to contact 118. The switches S-1 and S-2 thus provide a time reference control over the chopper device 48 and operates the relay coils 64 and 66 in accordance with the position of the cam 106.

So that the position of the cam 106 may be adjusted relative to the motor shaft 16, the cam could be adjusted on its spindle during rotation by means of a conventional mechanical, instrument-type differential gear box 140, such as is manufactured by the Ford Instrument Company of Long Island, New York, having a differential input or control shaft 142 which is manually or otherwise operable. The shaft may mount a suitable pointer 146 that cooperates with an angularly graduated indicia plate 148 provided on the housing by means of which the angular location of unbalance may be read.

In the operation of the unbalance measuring apparatus thus far described, the control shaft 142 of the differential gear box 140 is adjusted to position the cam 106 relative to the switches S-1, S-2 until a zero or null reading is obtained on the meter 98. Adjusting the control shaft 142 has the effect of changing the time of operation of the synchronous chopper with respect to the angular position of a fixed point on the workpiece 10 and therefore enables the device 50 to function as a reference signal means providing a pair of on-off reference signals to control the synchronous device 48. This enables the operator to determine the angular relationship between the actual unbalance combined with the simulated compensator unbalance and a fixed point on the workpiece. The angular location of unbalance is then read from the dial and pointer arrangement of the differential gear box. The amplitude of unbalance is displayed on the indicating meter 94 and is read therefrom when the null indicating meter 98 reads zero.

In accordance with the present invention, the unbalance magnitude and location readings obtained from meter 94 and the indicator arrangement associated with the differential control shaft of the differential gear instrument 140 are caused to be modified by a specified amount and angle corresponding to the residual unbalance that is desired to be left remaining in the workpiece after correction thereof. Thus, after the part is corrected, it will still be unbalanced by the amount and location of unbalance required to counter-balance or compensate for such unbalance that is contributed thereto by other parts which are subsequently attached to it. The residual unbalance together with its location is known in advance and will be set out by the balancing specifications.

Suppose the part is unbalanced by, say, 10 units located at zero degrees and that the unbalance contributed to the part by other components which are to be subsequently attached thereto is 2 units at 90 degrees. Since the unbalances do not have the same angular location, it is apparent that the compensation cannot be effected by simple addition or subtraction of the magnitude and location of the residual or compensating unbalance to or from the readings of magnitude and location of the true or actual unbalance in the part, and that resort to vectorial computations must be made. The compensation can be effected by considering that the contributory unbalance is present in the part and by considering the total effect of the actual unbalance and the contributory unbalance. The resultant effect of the actual unbalance in the part and the contributory unbalance in the above case, therefore, will be equal to the square root of the sum of their squares or $\sqrt{(10)^2+(2)^2}$ and will be located at an angle $\phi$ whose tangent is 2/10. Thus, the part could be balanced for the actual unbalance and the compensating unbalance by removing $\sqrt{104}$ units of unbalance at an angle whose tangent is 2/10 or by the addition of material at a point diametrically opposite this location.

When the part is corrected in this manner, it is apparent that the total correction quantity will have a component of 10 units at zero degrees for correcting the true or actual unbalance in the part and a component of 2 units located at 90 degrees to compensate for the contributory unbalance later to be added to the part. It will be noted that in this manner the actual and the contributory unbalance are both corrected with a single operation as distinguished from two separate operations that would otherwise be required if the effect of the contributory unbalance were separately considered and compensated for.

The above compensation is accomplished in the present invention electrically simply by combining an electrical signal of proper magnitude and phase with the unbalance pickup signal. The compensating signal is developed by an auxiliary electrical pickup device in conjunction with a unique point or mark on the workpiece to produce a triggering or synchronizing pulse that is applied to an electronic wave generator, which produces an output having a fundamental or main frequency component corresponding to the frequency of the unbalance pickup signal.

This point is shown as a hole 160 in the workpiece 10. It is assumed that each workpiece will be provided with such a hole or equivalent marker and that this marker will be utilized for securing additional workpieces thereto or will be such that any additional components that will be rotating with the workpiece will have an unbalancing effect at some predetermined location relative to this marker. As mentioned earlier, the electrical unbalance compensator of the present invention is employed in balancing machines that do not employ positioned loading of the workpiece relative to the balancing machine spindle, such, for example, as is disclosed in copending U.S. application Serial No. 550,057, filed November 30, 1955, in the names of C. J. Kinsey, P. K. Trimble and W. J. Volke, of common ownership herewith. Since the part 10, therefore, is not placed on the balancing machine spindle in a particular angular relation thereto, the hole 160 may have any angular relation with respect to a fixed point thereon.

However, the auxiliary pickup 162, which is shown herein as a magnetic pickup device, is angularly displaced by an angle $\phi$ from the unbalance pickup 23. The angle $\phi$ is the angle by which the compensating unbalance is to be displaced from the marker 160. The auxiliary pickup 162, which could also be of the photo-electric or capacitive variety if desired, is aligned with the marker hole 160 in the workpiece and is shown mounted on a radially and angularly adjustable mounting mechanism 163 which includes a pair of adjustable lever arm members 164 and 165 and a stationary upright support standard 166. Fixed in one end of arm 165 is an upright pivot shaft 167 which receives one end of arm member 164 having a clamp screw 168 therein for clamping it to the pivot shaft. The other end of arm member 165 is loosely received on the standard 166 and clamped thereto by screw clamp 169.

The hole in the workpiece passes over the auxiliary pickup once each revolution of the spindle 12 so that the pickup produces a triggering pulse or signal which is applied over conductors 170, 172 to an amplifier 174 whose output is connected over conductors 176, 178 to the input of the wave generator 180. The wave generator may be adapted to produce any type of wave form. However, in the present instance, it is a conventional one-shot multivibrator which, when triggered by the auxiliary pickup pulse, generates a symmetrical square wave having equal on-ff times. The time constant of the square wave generator is adjusted so that its on-time will be approximately one-half the time between pulses from the auxiliary pickup, thereby producing a square wave having a period corresponding to the cyclical speed of the balancing machine spindle and, therefore, the frequency of the unbalance pickup signal. Other forms of wave generators also could be employed.

The output of the wave generator 180 is applied to an attenuator shown at 182 as an adjustable voltage divider which supplies a portion of the output of the wave generator over conductors 184, 186 to the input of the amplifier 40 where it is vectorially combined with the signal from unbalance pickup 28. The attenuator or voltage divider 182 may be calibrated in terms of residual unbalance magnitude units and is set to introduce or inject an electrical signal shown at $d$ into the unbalance measuring circuit corresponding to the magnitude of residual unbalance it is desired to leave in the workpiece at a phase angle $\phi$ relative thereto corresponding to the location of the contributory unbalance as determined by the angular relationship between the pickups 28 and 162.

Inasmuch as the demodulating action of the chopper device 48 is accomplished at the frequency of the drive spindle 12, the device will act as a very narrow band-pass filter passing only those frequencies corresponding to the speed of the drive spindle, only the fundamental component of the wave generator 180 will be affected thereby together with the output of the unbalance pickup 28. Thus, for all practical purposes, only the fundamental component of the output of the wave generator need be considered, and since this component is of the same frequency as the unbalance pickup signal but is displaced in phase therefrom, it is apparent that the combining of the instantaneous amplitudes thereof in the amplifier 40 will be a harmonic vector combination, as in the case of simple alternating current sinusoidal signals.

It may thus be seen that the present invention provides an unbalance measuring apparatus which is capable of sensing the amount of initial unbalance present in a workpiece and to provide an indication of the correction which must be made to the workpiece to produce a residual unbalance of some predetermined amount and angularly displaced some predetermined amount from some physical marker on the workpiece.

What is claimed is:

1. In an unbalance indicating system, oscillatable support means for supporting a workpiece for rotation about its axis, unbalance pickup means responsive to vibrations induced in said support means by unbalance in said workpiece and developing an electrical unbalance signal having characteristics related to the magnitude and the location of unbalance therein, and unbalance compensating means for introducing an unbalance signal corresponding to a desired residual unbalance into the unbalance measurements for said workpiece, said unbalance compensating means including marker means provided at an arbitrary location on said workpiece, auxiliary electrical pickup means cooperating with said marker means and developing an electrical signal each time said marker means passes thereby, said auxiliary pickup being angularly displaced from said unbalance pickup means by a known angle determined by the desired location of said residual unbalance, electrical measuring means operatively interconnected with said unbalance pickup and said auxiliary electrical pickup means for indicating the amount and phase of the resultant of said signals, said measuring means including phase sensitive demodulating means, signal generating means operatively connected to said support means for providing a pair of 90 degrees phase related reference signals, means for varying and indicating the phase relationship between the position of a predetermined point on said support and said reference signals, said reference signals being operatively connected to said phase sensitive means.

2. In an unbalance indicating system, oscillatable support means for supporting a workpiece for rotation about its axis, unbalance pickup means responsive to vibrations induced in said support means by unbalance in said workpiece and developing an electrical actual unbalance signal having characteristics related to the magnitude and the location of actual unbalance therein, and unbalance compensating means for introducing a residual unbalance signal having characteristics related to the magnitude and location of a desired residual unbalance in the workpiece into the unbalance measurements for said workpiece, said unbalance compensating means including marker means provided at an arbitrary location on said workpiece, auxiliary electrical pickup means cooperating with said marker means and developing an electrical signal each time said marker passes thereby, electronic wave generating means interconnected with said auxiliary pickup means for developing an output signal wave having a fundamental frequency component corresponding to the frequency of the unbalance pickup signal and a magnitude corresponding to the desired amount of residual unbalance, said auxiliary pickup being angularly displaced from said unbalance pickup means by a particular angle, reference signal means operatively connected to said support means for producing a pair of 90 degrees phase displaced reference signals indicative of the angular position of a predetermined point on said support means, said reference signal means including means for varying and indicating the phase relationship between said reference signals and the angular position of a predetermined point on said workpiece, and electrical measuring means interconnected with said unbalance pickup means, said auxiliary pickup means and said reference signal means for indicating the phase and amplitude of the resultant of said actual and residual unbalance signals with respect to said reference signal.

3. Balancing apparatus for providing a rotating workpiece with a predetermined residual unbalance, said apparatus comprising drive means for rotating said workpiece, a vibration pickup arranged to produce a first signal indicative of the unbalance in said workpiece, residual unbalance simulating means responsive to the angular position of said workpiece independently of the angular position of said drive means to produce a second signal having a predetermined amplitude and a predetermined phase relationship to the angular position of a fixed point on said workpiece, circuit means adding said first and second signals to produce a resultant third signal indicative of the actual unbalance and predetermined residual unbalance, reference means operatively connected to said drive means for producing a reference signal indicative of the position of said drive means, said reference means including means for varying the phase relationship between said reference signal and the angular position of said drive shaft, measuring means operatively connected to and responsive to said third signal and said reference signal for indicating when said third signal and said reference signal are in phase, and means for indicating the phase relationship between said drive means and said reference signal when said resultant third signal and said reference signal are in phase, said measuring means including means for indicating the magnitude of said third signal when said reference signal and third signals are in phase.

4. The apparatus of claim 3 wherein said residual unbalance simulating means includes a pulse producing pickup triggered by a marker on said workpiece fixed point, and a square wave generator operatively connected to said pulse producing and responsive to pulses from said pulse producing pickup to produce a said second signal in the form of a square wave having a predetermined amplitude, said pulse producing pickup and said vibration pickup being angularly spaced a predetermined amount corresponding to the angle between the marker and the point of desired residual unbalance.

5. Balancing apparatus for providing a rotating workpiece with a predetermined residual unbalance, said apparatus comprising drive means for rotating said workpiece, a vibration pickup arranged to produce a first signal indicative of the actual unbalance in said workpiece, residual unbalance simulating means responsive to the angular position of said workpiece to produce a second signal having a predetermined amplitude and a predetermined phase relationship to the angular position of a fixed point on said workpiece, circuit means adding said first and second signals to produce a resultant third signal indicative of the actual unbalance and predetermined residual unbalance, reference means operatively connected to said drive means for producing a reference signal indicative of the position of said drive means, said reference means including means for varying the phase relationship between said reference signal and the angular position of said drive shaft, phase sensitive means operatively connected to and responsive to said third signal and said reference signal for indicating when said third signal and said reference signal are in phase, and means for indicating the phase relationship between said drive means and said reference signal when said resultant third signal and said reference signal are in phase, said phase sensitive means including means for indicating the relative magnitude of said third signal when said third signal and reference signals are in phase.

References Cited in the file of this patent

UNITED STATES PATENTS

| | | |
|---|---|---|
| 2,140,398 | Buckingham | Dec. 13, 1938 |
| 2,243,379 | Johnson | May 27, 1941 |
| 2,500,013 | Svensson | Mar. 7, 1950 |
| 2,622,437 | Frank | Dec. 23, 1952 |
| 2,731,835 | Hellar et al. | Jan. 24, 1956 |
| 2,746,299 | Federn et al. | May 22, 1956 |
| 2,804,775 | Hack | Sept. 3, 1957 |